US010012983B2

United States Patent
Seki

(10) Patent No.: US 10,012,983 B2
(45) Date of Patent: Jul. 3, 2018

(54) VEHICLE TRAVELING CONTROL APPARATUS

(71) Applicant: FUJI JUKOGYO KABUSHIKI KAISHA, Tokyo (JP)

(72) Inventor: Junya Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/404,745

(22) Filed: Jan. 12, 2017

(65) Prior Publication Data

US 2017/0235306 A1  Aug. 17, 2017

(30) Foreign Application Priority Data

Feb. 16, 2016 (JP) ................. 2016-027090

(51) Int. Cl.
| | |
|---|---|
| G05D 1/00 | (2006.01) |
| B60K 28/02 | (2006.01) |
| B60R 22/195 | (2006.01) |
| B60W 40/08 | (2012.01) |

(52) U.S. Cl.
CPC ......... *G05D 1/0061* (2013.01); *B60K 28/02* (2013.01); *B60R 22/195* (2013.01); *B60W 40/08* (2013.01); *B60W 2040/0818* (2013.01)

(58) Field of Classification Search
CPC .... G05D 1/0061; B60R 22/195; B60K 28/02; B60W 40/08
USPC .......................................................... 701/23
See application file for complete search history.

(56) References Cited

U.S. PATENT DOCUMENTS

| 4,569,536 A | * | 2/1986 | Tsuge | .................. B60K 28/06 180/268 |
|---|---|---|---|---|
| 2014/0062704 A1 | * | 3/2014 | Kubotani | ............... G08B 21/06 340/575 |

FOREIGN PATENT DOCUMENTS

| JP | H02-29531 B2 | | 6/1990 |
|---|---|---|---|
| JP | 2003-081115 | | 3/2003 |
| JP | 3125587 U | | 9/2006 |
| JP | 2010-018122 A | | 1/2010 |
| JP | 2010018122 A | * | 1/2010 |
| JP | 2010-125923 A | | 6/2010 |
| JP | 2010-134534 A | | 6/2010 |
| JP | 2012-111263 A | | 6/2012 |
| WO | 2012-160830 A1 | | 11/2012 |

OTHER PUBLICATIONS

NPL English translation of JP 2010018122 A provided from EPO.*

(Continued)

*Primary Examiner* — Yazan A Soofi
(74) *Attorney, Agent, or Firm* — Smith, Gambrell & Russell, LLP

(57) ABSTRACT

A vehicle traveling control apparatus includes an abnormality determining unit and a seat belt controller. The abnormality determining unit determines presence of impaired consciousness of a driver on a condition that the vehicle traveling control apparatus performs, to an own vehicle, automatic driving on a basis of traveling environment information on a traveling environment in which the own vehicle travels and traveling information of the own vehicle. The seat belt controller causes a seat belt of a driver's seat of the own vehicle to be retracted, when the abnormality determining unit determines the presence of the impaired consciousness.

15 Claims, 8 Drawing Sheets

(56) References Cited

OTHER PUBLICATIONS

First Japanese Office Action dated Jul. 4, 2017, in Japanese Patent Application No. 2016-027090 (7 pages—Japanese with English machine translation).

* cited by examiner

VEHICLE TRAVELING CONTROL APPARATUS

CROSS-REFERENCE TO RELATED APPLICATIONS

The present application claims priority from Japanese Patent Application No. 2016-027090 filed on Feb. 16, 2016, the entire contents of which are hereby incorporated by reference.

BACKGROUND

The technology relates to a vehicle traveling control apparatus that recognizes a traveling environment, and detects traveling information of an own vehicle to thereby perform automatic driving.

Various systems utilizing an automatic driving technique have been developed, in order for a driver to drive a vehicle more comfortably. The systems utilizing such an automatic driving technique have an override function of stopping an automatic driving control and switching over to manual driving to be performed by a driver, giving priority to an intention of the driver, when the driver performs a predetermined driving operation such as, but not limited to, a steering operation, and an accelerator pedal operation or a brake pedal operation in performing the automatic driving control.

For example, Japanese Unexamined Patent Application Publication (JP-A) No. 2003-81115 discloses a technique of detecting a steering wheel angle or a steering angular velocity to determine whether an intervention by a driver in steering is present, thereby switching driving modes, during automatic driving that provides corrected steering to avoid lane deviation.

SUMMARY

According to the technique disclosed in (JP-A) No. 2003-81115, automatic driving is simply deactivated to be switched over to manual driving to be performed by a driver upon determination that intervention by the driver is present during the automatic driving.

However, in some cases, it is not always preferable to simply deactivate the automatic driving upon the intervention by the driver in steering, depending on a state of the driver's consciousness.

When the driver suffers impaired consciousness, there is a possibility that the driver may collapse onto a steering wheel, for example, to inhibit steering performed by the automatic driving.

It is desirable to provide a vehicle traveling control apparatus that makes it possible to perform suitable automatic driving even in a case where a driver suffers impaired consciousness.

An aspect of the technology provides a vehicle traveling control apparatus that includes an abnormality determining unit and a seat belt controller. The abnormality determining unit determines presence of impaired consciousness of a driver on a condition that the vehicle traveling control apparatus performs, to an own vehicle, automatic driving on a basis of traveling environment information on a traveling environment in which the own vehicle travels and traveling information of the own vehicle. The seat belt controller activates a seat belt of a driver's seat of the own vehicle to be retracted, when the abnormality determining unit determines that the driver is in a state of the impaired consciousness.

DETAILED DESCRIPTION

Figure 1:
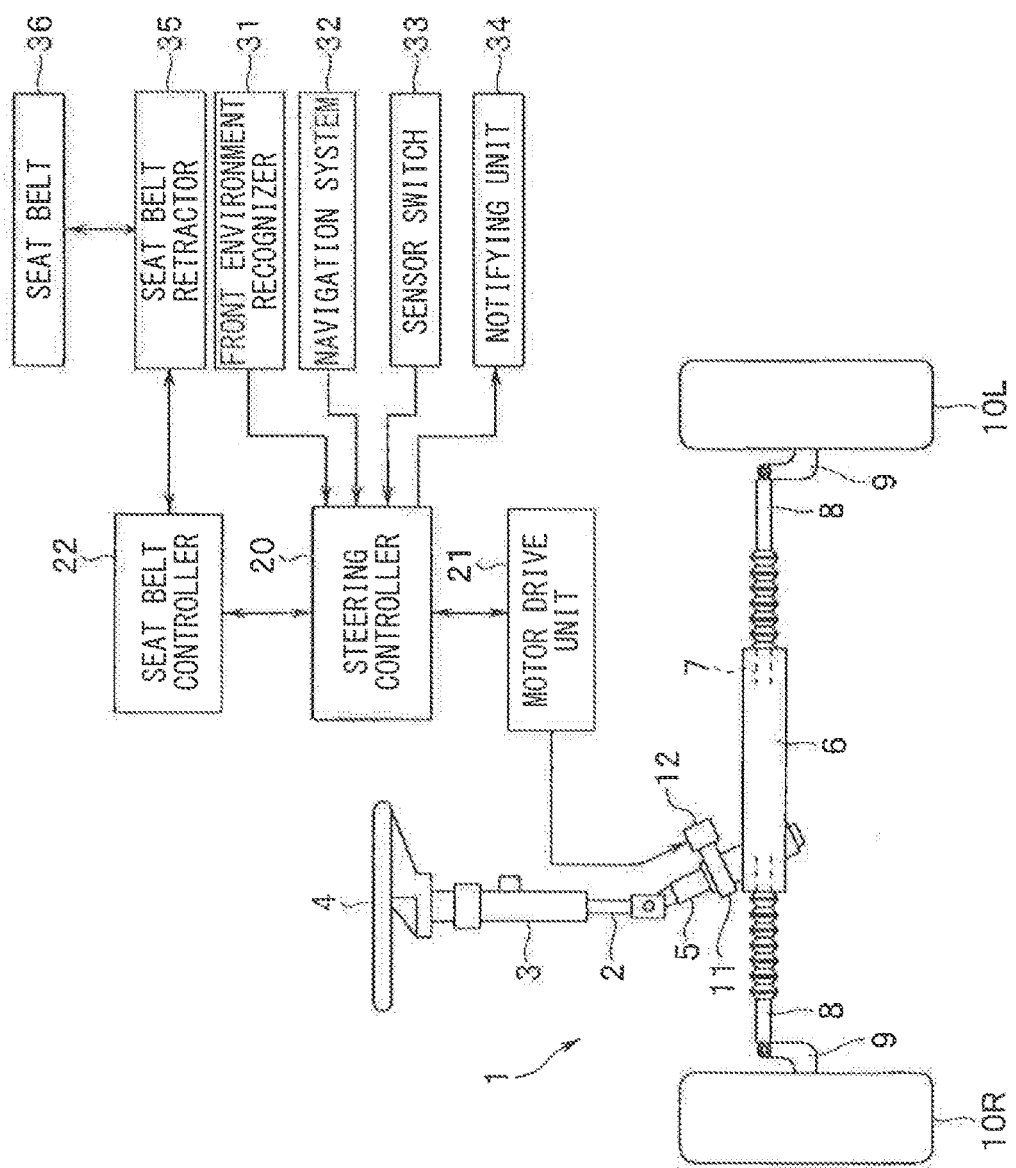
FIG. 1 illustrates an example of a schematic configuration of a steering system of a vehicle.
Figure 2:
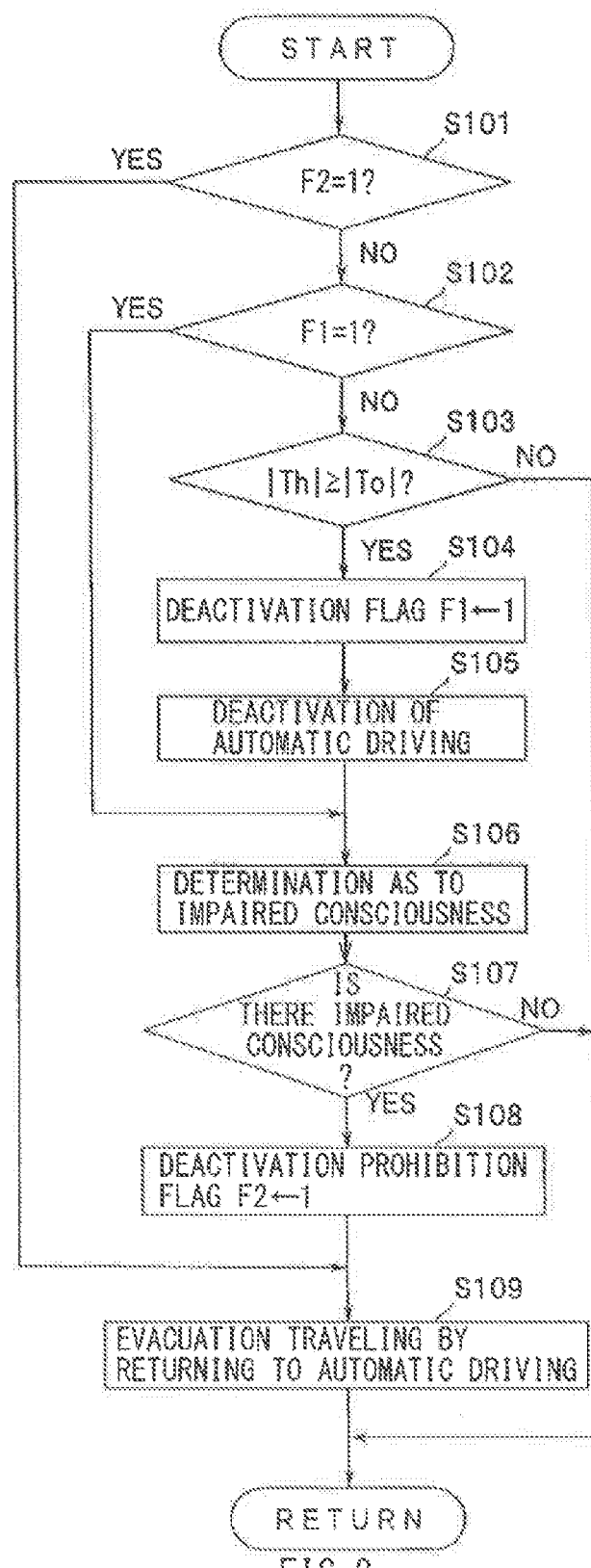
FIG. 2 is a flowchart illustrating an example of a routine that determines activation and deactivation of automatic driving.
Figure 3:
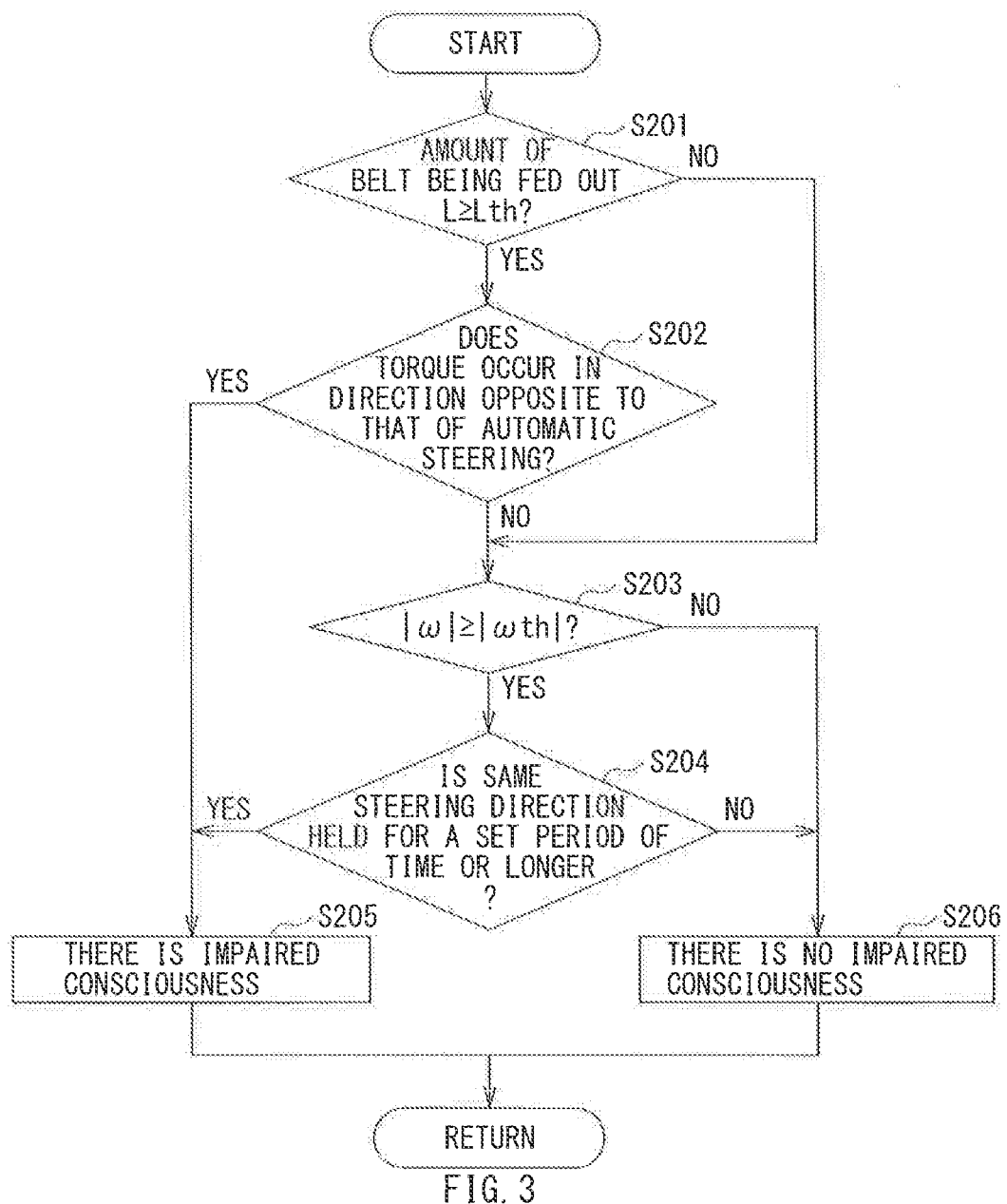
FIG. 3 is a flowchart illustrating an example of a subroutine that determines whether there is, impaired consciousness.
Figure 4:
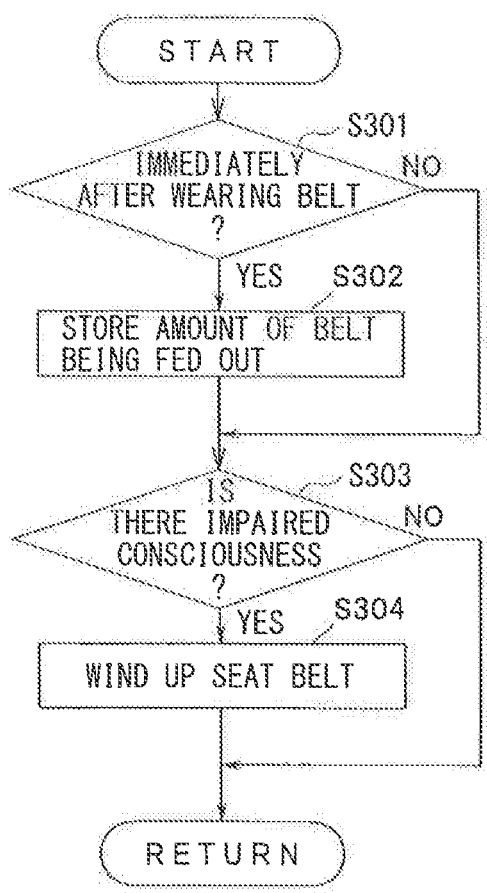
FIG. 4 is a flowchart illustrating an example of a routine that controls winding-up of a seat belt.
Figure 5:
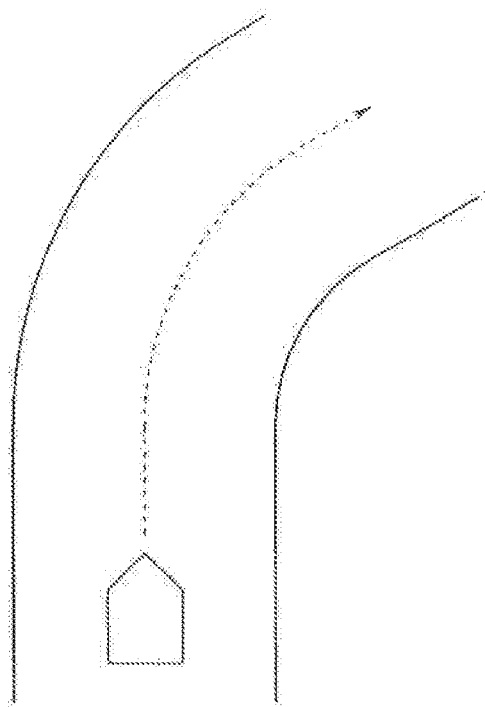
FIG. 5 describes an example of a target course to be followed by the automatic driving.
Figure 6:
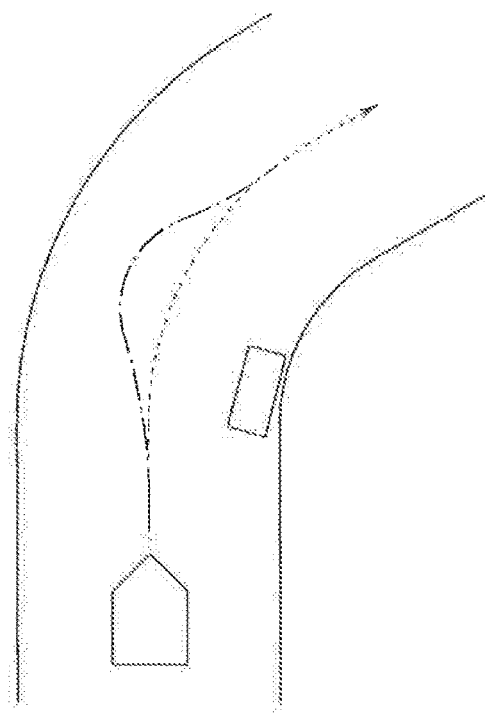
FIG. 6 describes an example of a traveling locus of an own vehicle at a time when a driver performs an intentional steering intervention for the target course.
Figure 7:
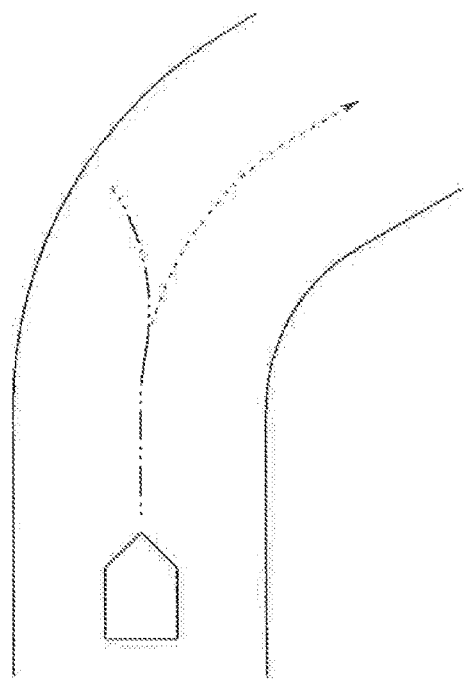
FIG. 7 describes an example of a traveling locus of the own vehicle at a time when a driver performs an unintentional steering intervention for the target course.
Figure 8:
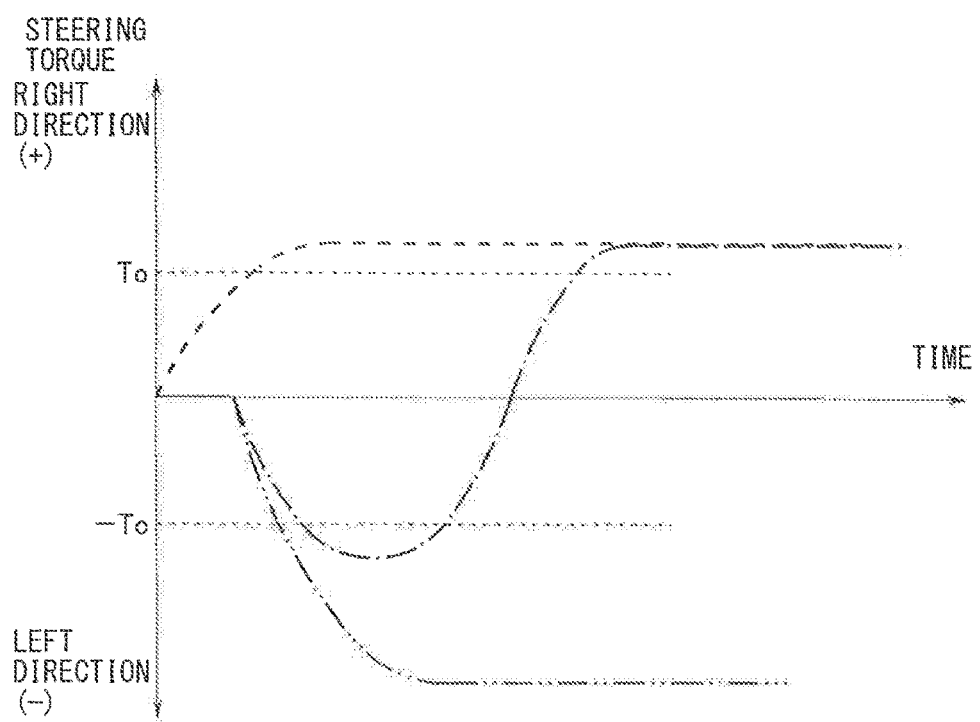
FIG. 8 describes an example of a target steering torque in the automatic driving and a steering torque provided by the driver.
Figure 9:
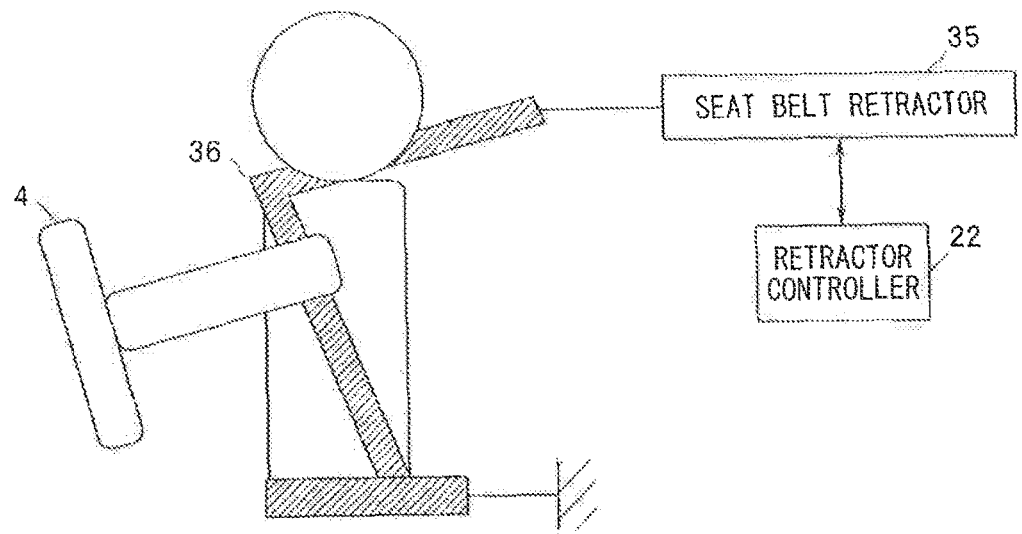
FIG. 9 schematically describes an example of a posture of a seated driver in a normal state and a corresponding state of a seat belt.
Figure 10:
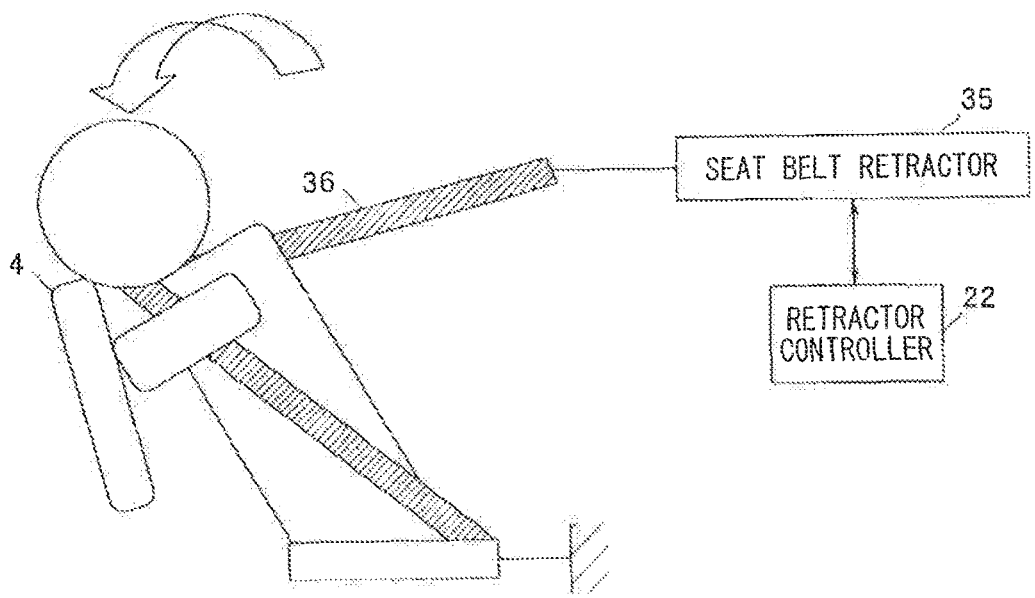
FIG. 10 schematically describes an example of a posture of a seated driver in a state of impaired consciousness and a corresponding state of the seat belt.
Figure 11:
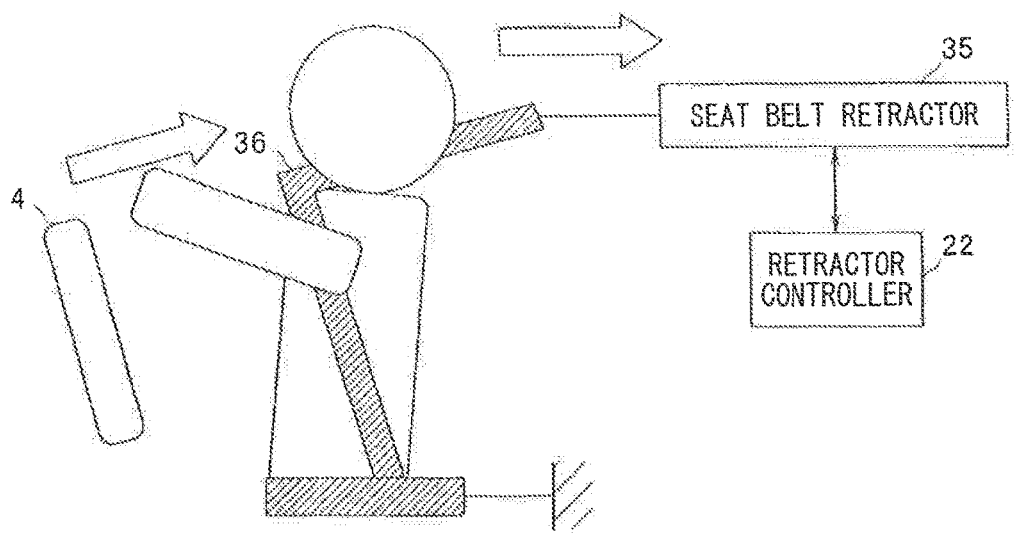
FIG. 11 schematically describes an example of the driver in the state of the impaired consciousness, with the driver's posture being fixed by the seat belt.

In the following, some implementations of the technology are described with reference to the accompanying drawings. The drawings relate to an implementation of the technology. FIG. 1 illustrates an example of a schematic configuration of a steering system of a vehicle. FIG. 2 is a flowchart illustrating an example of a routine that determines activation and deactivation of automatic driving. FIG. 3 is a flowchart illustrating an example of a subroutine that determines whether there is impaired consciousness. FIG. 4 is a flowchart illustrating an example of a routine that controls winding-up of a seat belt. FIG. 5 describes an example of a target course to be followed by the automatic driving. FIG. 6 describes an example of a traveling locus of an own vehicle at a time when a driver performs an intentional steering intervention for the target course. FIG. 7 describes an example of a traveling locus of the own vehicle at a time when a driver performs an unintentional steering intervention for the target course. FIG. 8 describes an example of a target steering torque in the automatic driving and a steering torque provided by the driver. FIG. 9 schematically describes an example of a posture of a seated driver in a normal state and a corresponding state of a seat belt. FIG. 10 schematically describes an example of a posture of a seated driver in a state of impaired consciousness and a corresponding state of the seat belt. FIG. 11 schematically describes an example of the driver in the state of the impaired consciousness, with the driver's posture being fixed by the seat belt.

Referring to FIG. 1, an electric power steering apparatus 1 may have a steering wheel angle that is freely set independently of an input of a driver. The electric power steering apparatus 1 may have a configuration in which steering shaft 2 may be supported pivotally by an unillustrated vehicle body frame via steering column 3. One end of the steering shaft 2 may be extended toward a driver's seat, and the other end of the steering shaft 2 may be extended toward an engine room. A steering wheel may be fixed to the end of the driver's seat side of the steering shaft 2. A pinion shaft 5 may be coupled continuously to the end of the steering shaft 2 extended toward the engine room.

A steering gear box 6 extended in a vehicle width direction may be provided in the engine room. A rack shaft 7 may be inserted to and supported by the steering gear box 6 reciprocatably. A pinion provided on the pinion shaft 5 may be engaged with an unillustrated rack provided on the rack shaft 7 to form a rack and pinion steering gear mechanism.

Both right and left ends of the rack shaft 7 may be each protruded from the respective ends of the steering gear box 6. A front knuckle 9 may be coupled continuously to each of the ends of the rack shaft 7 via a tie rod 8. The front knuckle 9 may pivotally support left and right wheels 10L and 10R that may serve as steered wheels, and may be supported by the vehicle body frame so as to be steerable. Therefore, when the steering wheel 4 is operated to rotate the steering shaft 2 and the pinion shaft 5, the rack shaft 7 may move in the right and left direction due to the rotation of the pinion shaft 5. With the movement, the front knuckle 9 may pivot about an unillustrated king pin, thus steering the left and right wheels 10L and 10R in the right and left direction.

An electric power steering motor (electric motor) 12 may be coupled continuously to the pinion shaft 5 via an assist transmission mechanism 11. The electric motor 12 may assist a steering torque applied to the steering wheel 4, and may impart a set target control amount. An electric power steering motor current value as a control output value may be outputted from a later-described steering controller 20 to a motor drive unit 21 to cause the motor drive unit 21 to drive the electric motor 12.

The steering controller 20 may be provided as a part of an unillustrated traveling control apparatus, or may be coupled to the traveling control apparatus. The steering controller 20 may set a target course (e.g., middle of a lane) along which a vehicle travels, and may control the vehicle to travel along the set target course by performing controls such as a feed forward control, and a feedback control for the target course.

Thus, a front environment recognizer 31, a navigation system 32, a sensor switch 33, and a notifying unit 34 may be coupled to the steering controller 20. The front environment recognizer 31 may recognize a front environment of the vehicle to obtain information on the front environment. The navigation system 32 may detect information on the position of the own vehicle (such as but not limited to latitude, longitude, and a direction of movement), display the position of the own vehicle on map information, and perform route guide to a destination. The sensor switch 33 may detect factors such as, but not limited to, a vehicle speed V, a steering wheel angle θH, and a steering torque Th. Further, the sensor switch 33 may receive information such as various settings related to the automatic driving, and information on ON-OFF of a brake pedal and on ON-OFF of an accelerator pedal. The various settings related to the automatic driving may include settings for factors such as ON-OFF of the automatic driving, a vehicle speed, a follow-up control to follow a preceding vehicle, an upper limit value and a lower limit value of acceleration and deceleration, and other functional limitations. The setting for the follow-up control to follow the preceding vehicle may include factors such as a following speed, departure while following, and ON-OFF of stopping of the following. The notifying unit 34 such as, but not limited to, an audio speaker and a liquid crystal display may inform information obtained from the devices such as the front environment recognizer 31 and the navigation system 32 as well as information related to the automatic driving. Further, a seat belt controller 22 that may control a seat belt retractor 35 of the driver's seat may be coupled to the steering controller 20. It is to be noted that the seat belt retractor 35 according to the present implementation of the technology may incorporate an unillustrated electric motor. The seat belt retractor 35 may drive the electric motor in response to a control signal supplied from the seat belt controller 22 to enable a seat belt 6 to be wound.

For example, the front environment recognizer 31 may be attached to a front portion of a ceiling in a vehicle interior at a certain interval from each other. The front environment recognizer 31 may include a pair of cameras that stereoscopically capture an object outside the vehicle from different points of views, and a stereo image processor that processes image data obtained from the cameras.

The processing of the image data obtained from the cameras may be performed by the stereo image processor of the front environment recognizer 31 in the following manner, for example. First, distance information may be determined on the basis of a shift amount between corresponding positions in a pair of stereo images captured by the cameras in an advancing direction of the own vehicle, to generate a distance image.

In recognition of data of the lane lines such as, but not limited to, white lines, a change in luminance in a width direction of a road may be evaluated on the grounds that the white lines are higher in luminance than a road surface. By performing, the evaluation, positions of the right and the left lane lines in an image plane may be identified on the image plane. Positions in real space (x, y, z) of the lane line may be calculated by any expression of coordinate transformation, on the basis of the positions (i, j) on the image plane and a parallax calculated from the positions on the image plane, i.e., on the basis of the distance information. In this implementation, without limitation, a coordinate system in the real space, set on the basis of a position of the own vehicle as a reference, may be defined as follows. A vehicle width direction may be an X axis, a vehicle height direction may be a Y axis, and a vehicle length direction, i.e., a distance direction, may be a Z axis, where the road surface immediately below a position in the midpoint of the cameras is defined as the origin. An X-Z plane where y is equal to zero (0) is coincident with the road surface when the road is flat. A traveling lane on the road on which the own vehicle travels may be divided into a plurality of sections in the distance direction. The right and the left lane lines in each of the sections may be approximated in a predetermined manner, and the approximated lane lines may be coupled to provide a road model.

On the basis of data of the distance image representing a three-dimensional distance distribution, the front environment recognizer 31 may perform a grouping processing, and may perform comparison with data such as three-dimensional road shape data and three-dimensional object data that are stored in advance to extract side-wall data on a guardrail, a curb, and a medial strip present along the road, and data on three-dimensional objects such as vehicles. As the three-dimensional object data, a distance from the own vehicle to the three-dimensional object and a temporal change of the distance (relative speed with respect to the own vehicle) may be determined. In particular, a vehicle having the following characteristics may be extracted as a preceding vehicle. That is, the vehicle being present on the traveling route of the own vehicle; being closest to the own vehicle; and traveling at a predetermined speed (e.g., 0 km/h or higher) in the substantially the same direction as the own vehicle may be extracted as the preceding vehicle. It is to be noted that a vehicle having a speed of about 0 km/h, out of the preceding vehicles, may be recognized as a preceding vehicle that is stopped.

The navigation system 32 may receive an electric wave signal sent from, for example, a global positioning system (GPS) satellite. By receiving the electric wave signal, the navigation system 32 may obtain information on the position, such as but not limited to latitude and longitude, of the own vehicle. The navigation system 32 may also obtain information such as a vehicle speed information supplied from the sensor switch 33 and information on a direction of movement supplied by means of sensors such as a geomagnetic sensor and a gyro sensor. The navigation system 32 may include a navigation electronic control unit (ECU) and a map database, both of which are not illustrated. The navigation. ECU may generate route information to provide a navigation diction. The map database may store map information such as, but not limited to, supplier data and data updated in a predetermined manner. The navigation system 32 may output the information by means of the notifying unit 34.

The navigation ECU may display route information to a destination specified by a user so as to be superimposed on a map image by means of the notifying unit 34, and may display the current position of the vehicle so as to be superimposed on the map information displayed on the notifying unit 34 on the basis of information on factors such as the position, speed, and traveling direction of the detected vehicle. Further, the map database may store information necessary for forming a road map, such as node data and facility data. The node data may relate to positions and shapes of roads constituting the map image. The node data may include, for example, data indicating a middle point of a road (lane) in the width direction, coordinates (latitude and longitude) of a point (a node point) on a road including a branch point (point of intersection) of a road, a direction and a classification (information indicating, e.g., an expressway, a trunk road, or an urban road) of the road that includes the node point, and a road type (a straight section, an arc section (an arc-shaped curve), or a clothoid curve section (a gentle curve)) and a curve curvature (or a curve radius) at the node point. Therefore, the traveling road of the own vehicle may be specified from the position on the map on which the current position of the vehicle may be superimposed, and traveling road information such as the curve curvature (or the curve radius) of the road and the direction of the road may be obtained from information indicating a node point that is closest to the position of the own vehicle using the traveling road of the own vehicle as a target advancing road. Further, the facility data may include data related to information on facilities present in the vicinity of the respective node points, and may be stored in association with the node data (or link data indicating links on which the nodes exist).

The steering controller 20 may detect traveling environment information on a traveling environment in which the own vehicle travels and traveling information on traveling of the own vehicle on the basis of the foregoing input signals, and may perform a steering control in the automatic driving on the basis of the traveling environment information and the traveling information. In other words, when the automatic driving is activated, the steering controller 20 may control an assist torque to be supplied by the electric motor 12 provided in the steering system of the vehicle to allow the own vehicle to travel along the target course on the basis of, for example but not limited to, a vehicle speed, a steering torque, a steering wheel angle, a yaw rate, and other vehicle information.

When the steering torque is inputted by the driver through the steering wheel 4 during the steering control performed by the automatic driving, the steering controller 20 may compare a steering torque |Th| inputted by the driver with a preset override determination threshold value |To| to determine deactivation of the automatic driving.

In this case, the steering controller 20 may determine whether the driver suffers impaired consciousness such as faint, and also may determine whether the input of the steering torque is performed intentionally by the driver, or performed unintentionally due to impaired consciousness such as faint. When the steering controller 20 determines that the input of the steering torque is an unintentional steering torque input, deactivation of the automatic driving may be prohibited, i.e., not only the deactivation per se of the automatic driving may be prohibited, but also the driving mode is returned to the automatic driving mode when the automatic driving has been deactivated.

When determining that the driver suffers impaired consciousness, the steering controller 20 may activate the seat belt retractor 35 through the seat belt controller 22 to fix the posture of the driver so that the driver is spaced away from the steering wheel 4 by retracting the seat belt 36, in order to prevent the automatic driving (steering control) from being inhibited by the driver who, for example, may collapse onto the steering wheel 4.

Thus, in one implementation of the technology, the steering controller 20 may serve as each of an automatic driving deactivation determining unit, an "abnormality determining unit", and an automatic driving deactivation prohibiting unit. The seat belt controller 22 may serve as a "seat belt controller".

Description is given next of determination as to activation and deactivation of the automatic driving performed by the steering controller 20, with reference to a flowchart of a routine that determines activation and deactivation of the automatic driving, illustrated in FIG. 2. The routine may be performed repeatedly at every set time during the time when the automatic driving is activated through the sensor switch 33. When the routine is started, the steering controller 20 may first check in step S101 whether a deactivation prohibition flag F2 for prohibiting deactivation of the automatic driving is set to "1".

When determination is made in step S101 that the deactivation prohibition flag F2 is set to "1", the steering controller 20 may proceed to step S109.

In contrast, when determination is made in step S101 that the deactivation prohibition flag F2 is not set to "1", the steering controller 20 may proceed to step S102.

When the flow proceeds from step S101 to step S102, the steering controller 20 may check whether a deactivation flag F1 is set to "1". The deactivation flag F1 may indicate that the automatic driving is deactivated.

When determination is made in step S102 that the deactivation flag F1 is set to "1", the steering controller 20 may proceed to step S106.

In contrast, when determination is made in step S102 that the deactivation flag F1 is not set to "1", the steering controller 20 may proceed to step S103.

When the flow proceeds from step S102 to step S103, the steering controller 20 may check whether an absolute value |Th| of the steering torque inputted by the driver detected by the sensor switch 33 is equal to or greater than an absolute value |To| of a preset steering input determination value (see FIG. 8).

When determination is made in step S103 that the absolute value |Th| of the steering torque is less than the absolute value |To| of the steering input determination value, the steering controller 20 may end the routine without any further processing.

In contrast, when determination is made in step S103 that the absolute value |Th| of the steering torque is equal to or greater than the absolute value |To| of the steering input determination value (e.g., see an alternate long and short dash line and an alternate long and two short dashes line in FIG. 8), the steering controller 20 may proceed to step S104.

When the flow proceeds from step S103 to step S104, the steering controller 20 may set the deactivation flag F1 that deactivates the automatic driving to "1". In the following step S105, the automatic driving may be deactivated. Thereafter, the flow may proceed to step S106.

When the flow proceeds from step S102 or step S105 to step S106, the steering controller 20 may determine whether the driver suffers impaired consciousness such as faint. The determination as to the impaired consciousness may be performed in accordance with, for example, a flowchart of a subroutine that determines whether there is impaired consciousness illustrated in FIG. 3. When the subroutine is started, the steering controller 20 may first check in step S201 whether an amount L of the seat belt of a driver's seat being fed out is equal to or greater than a preset threshold value Lth on the basis of information inputted from the seat belt controller 22. In the present implementation, the threshold value Lth denotes an amount of the seat belt being fed out, which may be presumed, for example, in a case where the driver suffers impaired consciousness such as faint to collapse onto the steering wheel 4. The threshold value Lth may be previously set on the basis of an experiment, a simulation, or other means.

When determination is made in step S201 that the amount L of the seat belt of the driver's seat being fed out is less than the threshold value Lth, the steering controller 20 may proceed to step S203.

In contrast, when determination is made in step S201 that the amount L of the seat belt of the driver's seat being fed out is equal to or greater than the threshold value Lth, the steering controller 20 may proceed to step S202. In step S202, the steering controller 20 may check whether the sensor switch 33 detects the steering torque Th in a direction opposite to the steering direction in automatic steering performed in the automatic driving.

When determination is made in step S202 that there occurs the steering torque Th in a direction opposite to the steering direction in the automatic steering, the steering controller 20 may proceed to step S205. In step S205, the steering controller 20 may determine that the driver suffers impaired consciousness such as faint, and the flow may end the subroutine.

In other words, for example, when the driver collapses onto the steering wheel 4 due to impaired consciousness such as faint, the pivoting operation of the steering wheel 4 performed by the automatic steering is inhibited by the driver, resulting in detection of the unintentional steering torque Th in a direction opposite to the steering direction in the automatic steering. Thus, the steering controller 20 may determine that the driver is in a state of the impaired consciousness such as faint, when the amount L of the seat belt of the driver's seat being fed out is equal to or greater than the threshold value Lth, and when the steering torque Th is detected in a direction opposite to the steering direction in the automatic steering.

In contrast, when determination is made in step S202 that there occurs no steering torque Th in a direction opposite to the steering direction in the automatic steering, the steering controller 20 may proceed to step S203. In step S203, the steering controller 20 may check whether an absolute value $|\omega|$ of a steering angular velocity (a differential value of the steering wheel angle $\theta H$) of the driver detected by the sensor switch 33 is equal to or greater than an absolute value $|\omega th|$ of the preset steering input determination value. In the present implementation, the absolute value $|\omega th|$ of the steering input determination value is set on the grounds that, when a driver's body is stiffened due to the impaired consciousness such as faint, for example, a steering input may be made at rapid angular velocity obviously different from that in normal steering. The absolute value $|\omega th|$ of the steering input determination value may be previously set on the basis of an experiment, a simulation, or other means.

When determination is made in step S203 that the absolute value $|\omega|$ of the steering angular velocity of the driver is less than the absolute value $|\omega th|$ of the steering input determination value, the steering controller 20 may proceed to step S206. In step S206, the steering controller 20 may determine that the driver does not suffer impaired consciousness such as faint, and the flow may end the subroutine.

In contrast, when determination is made in step S203 that the absolute value of the steering angular velocity of the driver is equal to or greater than the absolute value $|\omega th|$ of the steering input determination value, the steering controller 20 may proceed to step S204. In step S204, the steering controller 20 may check whether the steering input is made in the same steering direction by the driver for a set period of time or longer.

When determination is made in step S204 that the steering input is made in the same steering direction by the driver for the set period of time or longer, the steering controller 20 may proceed to step S205. In step S205, the steering controller 20 may determine that the driver suffers impaired consciousness such as faint, and the flow may end the subroutine.

In other words, for example, when the driver's body is stiffened due to the impaired consciousness such as faint, a steering input is made at rapid angular velocity to the steering wheel 4, and it is presumed that such a steering state may be kept due to the stiffened body of the driver. Thus, the steering controller 20 may determine that the driver is in the state of the impaired consciousness such as faint, when the steering is performed such that the absolute value $|\omega|$ of the steering angular velocity is equal to or greater than the absolute value $|\omega th|$ of the preset steering input determination value, and when the steering is kept for the set period of time or longer.

In contrast, when determination is made in step S204 that no steering input in the same steering direction for a set period of time or longer is made by the driver, the steering controller 20 may proceed to step S206. In step S206, the steering controller 20 may determine that the driver does not suffer impaired consciousness such as faint, and the flow may end the subroutine.

In the main routine in FIG. 2, when the flow proceeds from step S106 to step S107, the steering controller 20 may check the determination result in the foregoing processing in step S106.

When determination has been made in step S106 that the driver is not in the state of impaired consciousness, the steering controller 20 may proceed from step S107, and the flow may end the routine without any further processing.

In contrast, when determination has been made in step S106 that the driver is in the state of impaired consciousness, the steering controller 20 may proceed from step S107 to step S108. In step S108, the deactivation prohibition flag F2 may be set to '1,' and the flow may proceed to step S109.

When the flow proceeds from step S101 or step S108 to step S109, the steering controller 20 may perform evacuation traveling toward a place such as the shoulder by returning to the automatic driving operation, and the flow may end the routine.

Description is given next of a seat belt winding-up control performed by the seat belt controller 22, with reference to a flowchart of a routine of the seat belt winding-up control illustrated in FIG. 4. The routine may be performed repeatedly at every set time. When the routine is started, the seat belt controller 22 may first check in step S301 whether the present time is a time immediately after the driver has worn the seat belt 36.

When determination is made in step S301 that the present time is not the time immediately after the driver has worn the seat belt 36, the seat belt controller 22 may proceed to step S303.

In contrast, when determination is made in step S301 that the present time is the time immediately after the driver has worn the seat belt 36, the seat belt controller 22 may proceed to step S302.

When the flow proceeds from step S301 to step S302, the seat belt controller 22 may store the current amount of the seat belt 36 being fed out from the seat belt retractor 35 (see FIG. 9), and the flow may proceed to step S303.

When the flow proceeds from step S301 or step S302 to step S303, the seat belt controller 22 may check whether the driver suffers impaired consciousness such as faint on the basis of, for example, the foregoing result of the determination made by the steering controller 20 in step S106.

When determination is made in step S303 that the driver does not suffer the impaired consciousness, the seat belt controller 22 may end the routine without any further processing.

In contrast, when determination is made in step S303 that the driver suffers the impaired consciousness, the seat belt controller 22 may proceed to step S304.

When the flow proceeds from step S303 to step S304, the seat belt controller 22 may activate the electric motor of the seat belt retractor 35 to wind up the seat belt 36 to such a degree that the amount of the seat belt 36 being fed out is equal to or less than the amount of the seat belt 36 being fed out stored in step S302. By winding up the seat belt 36 the seat belt controller 22 may restrain the driver to an unillustrated seat back, and the flow may end the routine.

According to the foregoing implementation of the technology, during the automatic driving, the steering input |Th| provided by the driver may be compared with the preset steering input determination value |To| to determine deactivation of the automatic driving. Further, determination may be made as to an abnormal steering input in association with impaired consciousness of the driver. When determination is made that there is the abnormal steering input in association with impaired consciousness of the driver, deactivation of the automatic driving is prohibited to enable the automatic driving to be properly performed or deactivated in response to the steering input provided by the driver.

In other words, in a case where the automatic steering is performed to allow the own vehicle to travel along the target course (see, e.g., a broken line in each of FIGS. 5 and 8), when a predetermined steering input is provided by the driver who is not determined to suffer impaired consciousness, deactivation of the automatic driving may be performed to make it possible to achieve traveling in favor of an intention of the driver (see, e.g., an alternate long and short dash line in each of FIGS. 6 and 8). In contrast, when the driver is determined to suffer impaired consciousness, the steering input may be determined to be an unintentional steering input provided by the driver to prohibit deactivation of the automatic driving, thereby making it possible to accurately prevent occurrence such as lane deviation (see, e.g., an alternate long and two short dashes line in each of FIGS. 7 and 8) caused by the unintentional steering input provided by the driver who suffers impaired consciousness.

In this case, when the steering controller 20 determines that the driver is in the state of impaired consciousness, the seat belt controller 22 may control the seat belt retractor 35 to retract the seat belt 36 of the driver's seat to restrain the driver to the seat back. This makes it possible to avoid the interference of the driver with respect to the steering wheel 4 even when the driver suffers impaired consciousness, thus enabling preferable automatic driving to be performed.

In other words, by restraining the driver to the seat back by means of retraction using the seat belt 36, it becomes possible to allow the driver to be spaced away from the steering wheel 4 (see, e.g., FIG. 11) to avoid or reduce the intervention by the driver in the steering wheel 4, even in cases such as a case where the driver collapses onto the steering wheel 4 due to impaired consciousness such as faint (see, e.g., FIG. 10), and a case where an unintentional steering input is performed to the steering wheel 4 due to stiffness of the driver's body caused by impaired consciousness such as faint. Thus, it is possible to suitably achieve traveling such as evacuation traveling performed by the automatic driving in the case where the driver suffers impaired consciousness.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus comprising:
   an abnormality determining unit that determine presence of impaired consciousness of a driver on a condition that the vehicle traveling control apparatus performs to an own vehicle, automatic driving on a basis of traveling environment information on traveling environment in which the own vehicle travels and traveling information of the own vehicle; and
   a seat belt controller that causes a seat belt of a driver's seat of the own vehicle to be retracted, when the abnormality determining unit determines the presence of the impaired consciousness of the driver, and
   wherein the abnormality determining unit determines the presence of the impaired consciousness of the driver, when both conditions are met of (i) an amount of the seat belt of the driver's seat being fed out is equal to or greater than a set value, and (ii) a steering torque occurs in a direction opposite to a direction of steering performed by the automatic driving.

2. A vehicle traveling control apparatus comprising:
an abnormality determining unit that determines presence of impaired consciousness of a driver on a condition that the vehicle traveling control apparatus performs, to an own vehicle, automatic driving on a basis of traveling environment information on a traveling environment in which the own vehicle travels and traveling information of the own vehicle; and
a seat belt controller that causes a seat belt of a driver's seat of the own vehicle to be retracted, when the abnormality determining unit determines the presence of the impaired consciousness of the driver, and
wherein the abnormality determining unit determines the presence of the impaired consciousness of the driver, when both conditions are met of (i) an absolute value of an angular velocity of steering performed by the driver is equal to or greater than a set value, and (ii) a steering input provided by the driver is kept in a same direction for a predetermined period of time or longer.

3. The vehicle traveling control apparatus according to claim 1, wherein the abnormality determining unit alternatively determines the presence of the impaired consciousness of the driver, when both conditions are met of (a) an absolute value of an angular velocity of steering performed by the driver is equal to or greater than a set value, and (b) a steering input provided by the driver is kept in a same direction for a predetermined period of time or longer.

4. The vehicle traveling control apparatus according to claim 1, wherein when the abnormality determining unit determines the presence of the impaired consciousness of the driver during a time period of automatic driving, the traveling control apparatus prohibits deactivation of the automatic driving.

5. The vehicle traveling control apparatus according to claim 1, wherein when the abnormality determining unit determines the presence of the impaired consciousness of the driver, the traveling control apparatus prohibits deactivation of the automatic driving if still ongoing, or returns a driving mode to automatic driving mode when the automatic driving was discontinued before determining presence of impaired consciousness and after operator input indicative of a desire to override on ongoing automatic driving mode.

6. The vehicle traveling control apparatus according to claim 1, wherein when the abnormality determining unit fails to determine the presence of the impaired consciousness of the driver during a time period of automatic driving, the traveling control apparatus enables deactivation of the automatic driving based on driver override activity.

7. The vehicle traveling control apparatus according to claim 2, wherein when the abnormality determining unit determines the presence of the impaired consciousness of the driver during a time period of automatic driving, the traveling control apparatus prohibits deactivation of the automatic driving.

8. The vehicle traveling control apparatus according to claim 2, wherein when the abnormality determining unit determines the presence of the impaired consciousness of the driver, the traveling control apparatus prohibits deactivation of the automatic driving if still ongoing or returns a driving mode to automatic driving mode when the automatic driving was discontinued before determining presence of impaired consciousness and after operator input indicative of a desire to discontinue an ongoing automatic driving mode.

9. The vehicle traveling control apparatus according to claim 2, wherein when the abnormality determining unit fads to determine the presence of the impaired consciousness of the driver during a time period of automatic driving, the traveling control apparatus enables deactivation of the automatic driving based on driver override activity.

10. The vehicle traveling control apparatus according to claim 1, wherein when the abnormality determining unit determines the presence of the impaired consciousness of the driver during a time period of automatic driving, the traveling control apparatus causes the vehicle to perform an evacuation traveling, by the automatic driving.

11. The vehicle traveling control apparatus according to claim 10, wherein the evacuation traveling by the automatic driving involves movement of the vehicle to a road shoulder.

12. The vehicle traveling control apparatus according to claim 2, wherein when the abnormality determining unit determines the presence of the impaired consciousness of the driver during a time period of automatic driving, the traveling control apparatus causes the vehicle to perform an evacuation traveling by the automatic driving.

13. The vehicle traveling control apparatus according to claim 12, wherein the evacuation traveling by the automatic driving involves movement of the vehicle to a road shoulder.

14. The vehicle traveling control apparatus according to claim 1, wherein the abnormality determining unit determines the presence of impaired consciousness of a driver at a time when the vehicle traveling control apparatus is performing automatic driving.

15. The vehicle traveling control apparatus according to claim 2, wherein the abnormality determining unit determines the presence of impaired consciousness of a driver at a time when the vehicle traveling control apparatus is perform ng automatic driving.

* * * * *